United States Patent [19]
Venkataraman

[11] Patent Number: 5,830,923
[45] Date of Patent: Nov. 3, 1998

[54] FOAMED FLUOROPOLYMER

[75] Inventor: Sundar Kilnagar Venkataraman, Vienna, W. Va.

[73] Assignee: E. I. du Pont de Nemours and Company, Wilmington, Del.

[21] Appl. No.: 841,907

[22] Filed: Apr. 17, 1997

Related U.S. Application Data

[60] Provisional application No. 60/018,090 May 22, 1996.
[51] Int. Cl.$^6$ .................. C08J 9/08; C08J 9/14; B27J 5/00
[52] U.S. Cl. .................. 521/64; 264/50; 264/51; 264/53; 264/127; 521/79; 521/145
[58] Field of Search .................. 521/64, 97, 79, 521/145; 264/50, 51, 53, 127

[56] References Cited

U.S. PATENT DOCUMENTS

| | | | |
|---|---|---|---|
| 5,071,610 | 12/1991 | Hagen et al. | 264/120 |
| 5,268,395 | 12/1993 | Simandl et al. | 521/64 |
| 5,422,377 | 6/1995 | Aubert | 521/64 |
| 5,500,450 | 3/1996 | Simandl et al. | 521/64 |
| 5,668,188 | 9/1997 | Whinnery et al. | 521/64 |
| 5,670,102 | 9/1997 | Perman et al. | 264/50 |

*Primary Examiner*—Morton Foelak

[57] ABSTRACT

Fabricated articles of fluoropolymer are foamed by heating the articles to a deformable state, pressurizing the heated article with supercritical $CO_2$, depressurizing the pressurized heated article while still in the foamable state, whereby said $CO_2$ foams said article, and cooling the resultant foamed article.

15 Claims, 2 Drawing Sheets

3.0 μm 1.00 μm

750 μm 3.0 μm

FOAMED FLUOROPOLYMER

CROSS-REFERENCE TO RELATED APPLICATION

This is application claims the benefit of U.S. Provisional Application No. 60/018,090, filed May 22, 1996.

FIELD OF INVENTION

This invention relates to the foaming of fluoropolymers and their foamed structures.

BACKGROUND OF THE INVENTION

Polytetrafluoroethylene (PTFE) articles have been expanded by several methods to produce highly porous articles, with small pore sizes. U.S. Pat. No. 3,664,915 discloses the method of stretching articles of the fine powder type of PTFE to produce porous films in which porosity is defined by nodes and fibrils, the nodes being at least 1000× thicker the fibrils, and the pore size is at least 0.2 micrometers. Even smaller pore sizes, as low as 0.01 micrometers, have been reported in U.S. Pat. No. 4,110,392. PCT 93/12, 332 discloses the method of swelling PTFE, either the fine powder or the granular types, such as in billet form, with such fluids as organic or inorganic liquids or such gases as ammonia, nitrogen, sulfur dioxide, and carbon dioxide. The swelling step is carried out under pressure and at elevated temperature, and this is followed by slow, controlled cooling of the swollen article. Following the cooling step, the pressure is then released and the fluid is then removed from the PTFE, yielding a porous (swollen) PTFE structure having a void content of 15 to 35% and consisting of a mass of interconnecting fibrils. Stretching of the swollen article increases the void content to at least 40% and reduces pore size to be less than 10 micrometers and as low as 0.1 micrometers.

Melt-fabricable fluoropolymers have been foamed as they are fabricated, e.g. by melt extruding them in the presence of a blowing agent, either contained in the fluoropolymer feed to the extruder or a gas injected into the fluoropolymer within the extruder, whereupon the extrudate foams as it is extruded. The fluoropolymer may contain a foam cell nucleating agent such as disclosed in U.S. Pat. No. 5,023,279, to produce smaller foam cells and higher void content. The disadvantage of this approach is that foaming during extrusion favors the use of low melt viscosity resin instead of higher melt viscosity resin which exhibit higher melt strength and better physical properties for the extrudate.

There is a need for the ability to foam PTFE with efficiency and economy and for the ability to foam melt-fabricable fluoropolymer after fabrication so that the limitations on fabrication imposed by the foaming process are not present.

SUMMARY OF THE INVENTION

The present invention satisfies these needs by the process for foaming an article of fluoropolymer which has already been fabricated, comprising (a) heating the article to a foamable state, (b) pressurizing the heated article with supercritical carbon dioxide, (c) depressurizing the pressurized heated article while still in the foamable state, whereby said carbon dioxide foams said article, and (d) cooling said foamed article.

Steps (a) and (b) can be carried out in the sequence given or in reverse sequence or simultaneously.

In one embodiment of the process, the fluoropolymer is polytetrafluoroethylene, which may be unsintered or sintered, and if unsintered may be sintered as the foaming occurs by the heating of the article in the foamable state. The resultant foamed article of polytetrafluoroethylene can have a novel structure which is essentially a three-dimensional network of fibrils and no nodes, with this fibrillar network having a ladderlike appearance.

In another embodiment of the process, the fluoropolymer is melt-fabricable, and this embodiment can also produce a novel structure within the foamed article. The usual foamed structure for fluoropolymers foamed during extrusion is fairly round cells serving as the voids within the foamed article, with these cells being separated by thin fluoropolymer cell walls. In the novel structure produced by the process of the present invention, the cell walls themselves have openings which communicate between adjacent cells, i.e. the cell walls have the appearance of Swiss cheese. Another novel structure of melt-fabricable fluoropolymer made by the process of the present invention is characterized by the fluoropolymer being in the form of a three-dimensional network of interconnecting fibrils. Variations in the process to obtain these different structures will be described later herein.

The fibrillar structures obtained for the polytetrafluoroethylene (non-melt fabricable fluoropolymer) and the melt fabricable fluoropolymer may also be referred to as expanding these fluoropolymers to produce a porous structure. For simplicity, however, the expansion to produce the fibrillar structure as well as the expansion which produces cells defined by cell walls are collectively referred to herein as foaming of the fluoropolymer making up the article. Similarly, the term "cells" herein is used to identify both the cells defined by cell walls and the pores created by the expansion which forms the fibrillar structure.

The pressurization of the article with supercritical $CO_2$ is believed to cause the $CO_2$ to dissolve in the article. In the dissolved condition, the fluoropolymer making up the article and the $CO_2$ form a homogeneous mixture, wherein the $CO_2$ is not present as a separate phase within the polymer. The depressurization of the article in both embodiments heated to the foamable state is rapid so that the $CO_2$ comes out of solution in the polymer and causes the articles to foam rather than diffuse out of the polymer as would be the case if either the depressurization were slow or the article was cooled while maintaining pressure until the article is no longer in the foamable state or both.

The foamable state of the fluoropolymer enables the polymer to be deformed internally by the $CO_2$ coming out of solution to form cells (pores). At the same time, the article itself, while foaming, does not lose its original shape, i.e. the article while expanding to change in size, (unless the expansion is physically constrained) does not change in shape.

Polytetrafluoroethylene which has virtually no melt flow can retain its shape for long periods of heating at the foamable state, but is nevertheless internally deformable by the $CO_2$ coming out of solution. Melt fabricable fluoropolymer will preferable be heated to a temperature less than its crystalline melting point to avoid deformation of the article shape, but fluoropolymer having a high enough viscosity can also be heated above its melting point for a period of time in which the $CO_2$ is pressured into the article, without losing its shape.

DETAILED DESCRIPTION OF THE INVENTION

Figure 1:
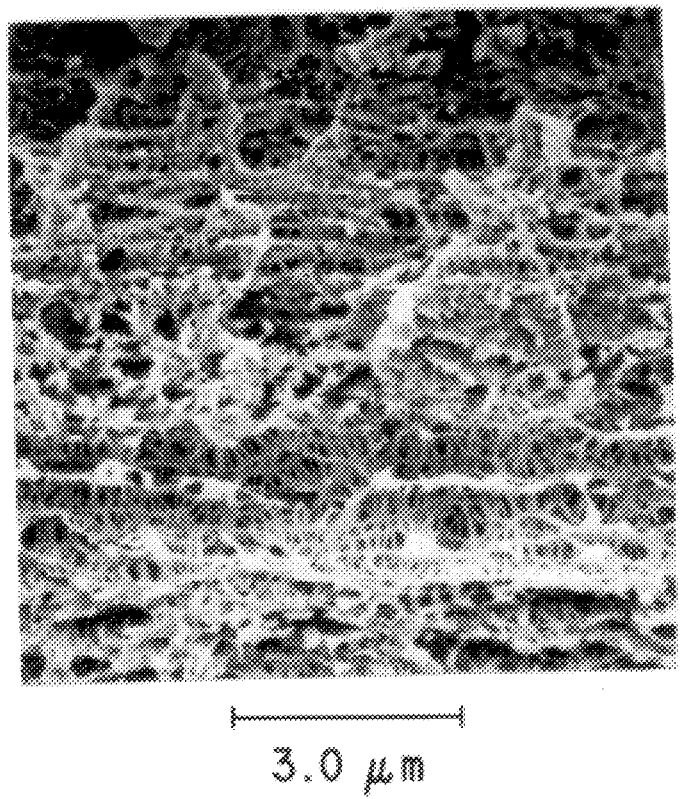
FIG. 1 is a scanning electron micrograph (SEM) at 10,000× magnification of a cross-section of an article made of polytetrafluoroethylene by the process of the present invention as practiced in Example 8. The ladderlike appearance of interconnecting fibrils and the absence of nodes is visible in this Fig.
Figure 2:
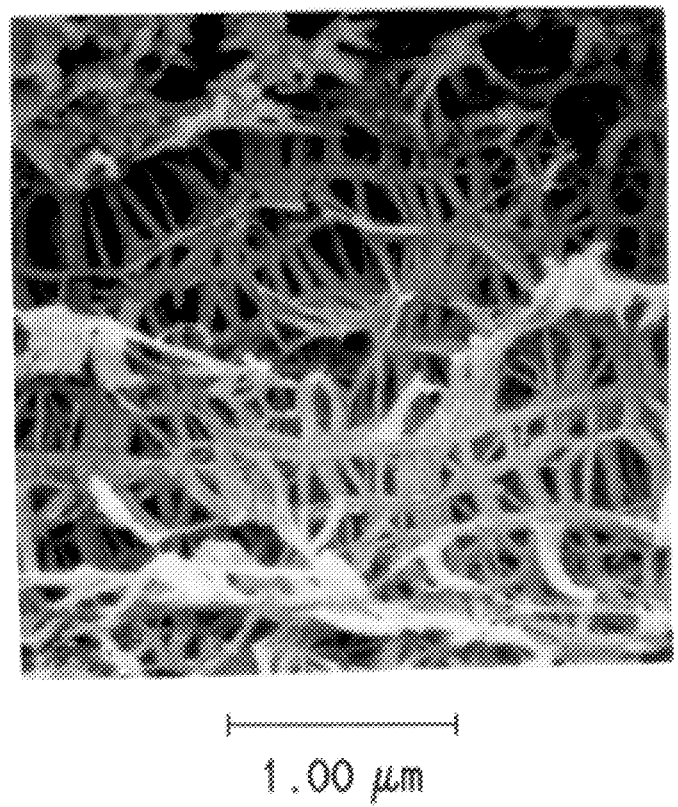
FIG. 2 is a SEM at 30,000× magnification of a portion of FIG. 1 showing that the lightest colored areas appearing as masses rather than fibrils are at the fracture interface (cooled in liquid nitrogen and then fractured for SEM), thereby being an artifact of the fracturing technique rather than characteristic of the foam structure.

The fluoropolymers useful in the process of the present invention include the fluoropolymers which are non melt-fabricable and the fluoropolymers which are melt-fabricable. Such fluoropolymers will generally contain at least 35 wt % fluorine. The non-melt fabricable fluoropolymers generally have a melt viscosity of at least $1\times10^8$ Pa.s at 372° C., and the melt-fabricable fluoropolymers will generally have a melt viscosity of $1\times10^2$ Pa.s to $1\times10^5$ Pa.s as determined from melt flow measurement in accordance with ASTM D1238 using standard conditions for each resin. For the melt-fabricable fluoropolymers, the melt viscosity selected will depend of the particular fluoropolymer being used, the article being made, and the fabricating process being used.

Examples of the non-melt fabricable polymers include the fine powder resin type and granular resin type of polytetrafluoroethylene (PTFE). The fine powder resin is typically made by aqueous dispersion polymerization to yield a dispersion of PTFE particles which is coagulated and dried to form the fine powder resin. This type of PTFE is fibrillatible and is typically processed by blending with a lubricant and paste extrusion of the blend into the shape desired, e.g. wire coating (insulation), tubing, rod, and other beading shapes, and film, followed by sintering. Rapid stretching of the unsintered extrudate yields the expanded PTFE as in U.S. Pat. No. 3,664,915. The granular resin type is typically made by suspension polymerization, is not fibrillatible, and is typically fabricated by ram extrusion or cold compaction, followed by sintering. The fabricated article can be in the form of a billet from which articles such as film or tape is skived. The PTFE of either type includes the homopolymer of tetrafluoroethylene (TFE) and modified PTFE, which is a copolymer of TFE with a small amount of at least one other comonomer such that melting temperature is not substantially lower than the homopolymer. The modified PTFE is also non-melt-fabricable. Such comonomers include chlorotrifluoroethylene, perfluorobutyl ethylene, perfluoroolefin having from 3 to eight carbon atoms, and perfluoro (alkyl vinyl ether) (PAVE) having from 3 to 8 carbon atoms, with perfluoro(ethyl or propyl vinyl ether) being preferred PAVE comonomers. In the non-melt fabricable modified PTFE, the comonomer content will generally be less than 0.2 mol %.

Examples of melt-fabricable fluoropolymers include (i) homopolymers of chlorotrifluoroethylene (CTFE), and vinylidene fluoride, (ii) copolymers of TFE and a monomer of (i), and (iii) copolymers of at least one of the monomers of (i) or (ii) and at least one monomer selected from the group consisting of ethylene (E), perfluoroolefins having from 3 to 8 carbon atoms, perfluoro(alkyl vinyl ethers) (PFA), including perfluoro(alkoxy alkyl vinyl ethers) having from 3 to 12 carbon atoms, and perfluoroalkyl ethylene having from 3 to 8 carbon atoms. Especially preferred such fluoropolymers are the tetrafluoroethylene copolymers including TFE/hexafluoropropylene copolymer (FEP), TFE/perfluoro(methyl, ethyl, or propyl vinyl ether) copolymer (TF4), ETFE, ECTFE, and TFE/vinylidene fluoride/hexafluoropropylene copolymer. Additional comonomer may be present in the copolymer, e.g. E/TFE/perfluorobutyl ethylene. Polyvinyl fluoride may also be used. The melt-fabricable fluoropolymers can be crystalline or amorphous.

Articles may be fabricated from these fluoropolymers by any of the known methods used on the particular fluoropolymer being fabricated. Fabrication methods for non-melt-fabricable fluoropolymers have been mentioned above. Typically fabrication methods for melt-fabricable fluoropolymers include extrusion (melt), injection molding, and blow molding. The shaped articles can be in such forms as wire and cable insulation and jacket, tubing, rods or other beading shapes, film, tape and containers. The articles foamed in accordance with the present invention have already been fabricated to their final shape prior to foaming, i.e. the heating/pressurization/foaming steps do not cause the article to change shape.

The fluoropolymer resin fabricated into an article may be in the form of a composition which comprises a foam cell nucleating agent, such as boron nitride as disclosed in U.S. Pat. No. 4,764,538. Along with the boron nitride may be present a thermally stable inorganic salt, also as disclosed in this patent. Examples of inorganic salts include calcium tetraborate, sodium tetraborate, potassium tetraborate, calcium carbonate, zinc tetraborate, and barium nitrate. The concentration of the boron nitride may be 0.5 to 2 wt % if used by itself and 0.05 to 1 wt % if used in conjunction with the salt. Other foam cell nucleating agents can be used in the fluoropolymer composition, e.g. the fluorinated sulfonic and phosphonic acids and salts disclosed in U.S. Pat. No. 5,023,279, such Telomer B sulfonic acid having the formula $F(CF2)_nCH_2CH_2SO_3H$ and salts thereof, wherein n is an integer of 6 to 12, wherein the particular Telomer B is identified by the predominant value of the integer "n", e.g. BaS-10 is the barium salt of the sulfonic acid wherein n=10 as the predominant chain length present. Additional salts include KS-8 (potassium salt of Telomer B wherein n=8 as the predominant chain length) KS-10, BaS-8, and ZrS-10. Such foam cell nucleating agents, when used, will be used in a concentration of 0.005 to 0.8 wt %. The boron nitride and inorganic salt may be used in combination with the fluorinated sulfonic or phosphonic acid or salt thereof. Alternatively, other foam cell nucleating agents can be used, such as talc or metal oxides such as MgO, $Al_2O_3$, and $SiO_2$. The fluorinated sulfonic or phosphonic acid or salt thereof can be used in combination with the thermally stable salt, with no boron nitride being present, as the foam cell nucleating agent. The foam cell nucleating agent produces smaller foam cells within the article being foamed by the $CO_2$ in accordance with the process of the present invention. The melt-fabricable fluoropolymers are the preferred fluoropolymers for which foam cell nucleating agent is used.

The process of the present invention is carried out on articles of the fluoropolymer which are unfoamed, even though foam cell nucleating agent may be present in the fluoropolymer. In the case of melt extrusion of melt-fabricable fluoropolymer, the extrusion to form the article will be carried out with no blowing agent present. Air may be present in the extruder, entering with the fluoropolymer feed, which may end up as voids in the extruded article, but the void content from this contaminant will be less than 5% and preferably less than 3%, which is considered an unfoamed condition. In the case of paste extrusion of PTFE fine powder, the lubricant is normally driven off from the extrudate by heating to 200° C.; then the extrudate is heated to higher temperature to sinter the extrudate to an essentially void-free article. The process of the present invention, however, can be practiced on unsintered PTFE, and depending on the temperature used in carrying out the process, the sintering can occur during the practice of the process.

In accordance with the process of the invention, the unfoamed shaped article(s) of fluoropolymer is placed in a pressure vessel. The article of fluoropolymer can be by itself or part of a composite structure; forming of the article herein refers only to the fluoropolymer portion thereof. The article can then be heated, e.g. by heating the pressure vessel, to a temperature at which the polymer of the article is in the foamable state. Prior to the heating, the $CO_2$ may be introduced, or its introduction may be delayed until the article has been heated. If introduced when the vessel is cold, the subsequent heating will increase the $CO_2$ pressure within the vessel. The heating and pressurization may be carried out simultaneously or sequentially. In any event, the pressurizing of the article with $CO_2$ above its critical temperature of about 31° C., i.e. supercritical $CO_2$, causes the $CO_2$ to permeate the article. Since the article is made of fluoropolymer, it has a relatively high melting temperature, or in the case of amorphous fluoropolymer, a relatively high softening point, whereby the temperature at which the foamable state will be attained is generally above 200° C. The temperature used will depend on the particular fluoropolymer present in the article, and in the case of melt-fabricable fluoropolymer, on the viscosity, and the time of heating for complete permeation of the $CO_2$ into the article. The heating is maintained at the temperature desired for a time which is effective for the entire article to be uniformly heated and permeated with the supercritical $CO_2$. The $CO_2$ pressure within the vessel will generally reach at least 1070 psi (7.4 MPa), the critical pressure. The higher the pressure, the shorter the time at peak temperature for the article to be uniformly heated and saturated with the $CO_2$. Article thickness will also be a factor on the time and temperature of heating. The particular conditions will be selected so that the desired foaming takes place when the vessel is depressurized, without the article losing its shape, while in the foamable state. For example, when the fluoropolymer is FEP, the temperature of heating will typically be from 220° to 250° C., as compared to the melting point of 260° C. for this copolymer. When the fluoropolymer is PFA (melting point 310° C.), the temperature will typically be from 280° to 325° C., and when PTFE (m.p. 327° C.), the temperature will typically be from 310° to 350° C. Melting points referred to herein are determined by standard DSC analysis, and also refer to the melting point of the resin in the absence of the $CO_2$. It is especially unexpected that the foaming can be carried out at temperatures at or below the melting point of the resin, e.g. in the range of the melting point to 50° C. below the melting point. Of course, as stated above, the foaming can also be carried out on amorphous fluoropolymer at temperatures at which the article of the fluoropolymer does not lose it shape.

Figure 3:
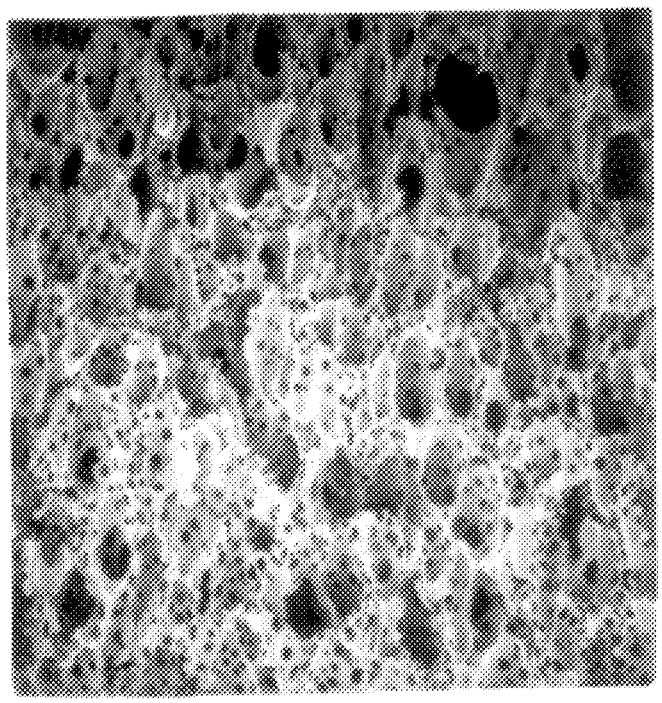
FIG. 3 is a SEM at 40× magnification of a cross-section of an article made of melt-fabricable fluoropolymer by the process of the present invention as practiced in Example 6(c). The Swiss cheese appearance of the foam cell walls is visible in this Fig.

Depressurization is preferably carried out rapidly, e.g. by simply venting the $CO_2$, so that the article within the vessel reaches atmospheric pressure in less than 2 minutes. This depressurization while the fluoropolymer of the article is in the foamable condition causes the article to foam, by virtue of the $CO_2$ permeating the article becoming gaseous to form cells or pores within the article. Since the $CO_2$ is permeated throughout the interior of the article, foaming occurs throughout the interior of the article, or in other words, the foaming of the article within its interior is substantially uniform. The cell size is quite small, e.g. less than 100 to 500 micrometers. The apertures in the cell walls shown in FIG. 3 will generally be from 10 to 40 micrometers, but cell sizes as small as 2 to 20 micrometers can be obtained as indicated in Example 4. Especially for PTFE, the foam cell sizes can be less than 2 micrometers. The same is true when the foamed structure in the article of melt-fabricable fluoropolymer is in the form of fibrils rather than spherical cells. When the foamed structure is fibrillar rather than spherical cells, the fibrils generally have a length-to diameter ratio of at least 10:1 as determined by measurement of representative fibrils in the SEM at 10,000× magnification. The foamed structure of articles made from melt-fabricable fluoropolymer can be varied between spherical cells and fibrillar structure by lowering the temperature at which the foaming takes place as shown in Example 6(c), and (d). The process of the present invention is capable of producing foamed structures having void contents of at least 70% and average cell size of no greater than 20 micrometers.

The foamed article is then cooled to stabilize the foamed shape and foam structure, which can be done by opening the pressure vessel to the atmosphere after depressurization and foaming.

The result of the process of the present invention is the preparation of foamed articles having a wide variety of shapes and having a void content of generally at least 15% and more often, at least 40%. Normally, in the prior art foaming processes, the smaller the cell size, the smaller the void content. The present invention can provide both small cell size and high void content.

The process of the present invention is especially advantageous because it is able to foam articles of non-melt fabricable fluoropolymer, regardless of the method of fabricating the article that is used. In addition, the fabricating method does not have to be changed to form the article that will be subsequently foamed. For melt-fabricable fluoropolymer, one of the advantages of the process of the present invention is that the article can be extruded at a higher production rate, because the extrusion is not slowed down by the foaming operation. In the case of forming insulation on wire by melt drawdown of the extruded resin onto wire, the melt strength of the resin is weakened by foaming occurring in the melt drawdown region, which requires the extrusion rate to be reduced, even though low melt viscosity resin is used to promote high extrusion rates. Tubing, for example, requires vacuum sizing of the outer diameter (OD) of the foamed tubing as made by the conventional extrusion/foaming process. The vacuum sizing tends to collapse and compress the foam, reducing void content. In accordance with the present invention, the tubing is extruded solid, using vacuum sizing of the O.D. of the tubing, but without any effect on foam, because the foaming step is delayed until practice of the process of the present invention when vacuum sizing is no longer necessary. For example, a solid skin of fluoropolymer can be coextruded along with the fluoropolymer to be later foamed. The solid skin does not foam and thereby forms a built-in sizer for the OD of the tubing during the foaming process. In addition, while low melt viscosity resin is preferred for ease of extrusion, this resin has the disadvantage of tending to sag or distort prior to solidification into the tubing shape. High melt viscosity resin provides a better tubing extrusion result, but increases the difficulty in obtaining the foaming desired. The process of the present invention, enables the preferred high melt viscosity resin to be used to form the extruded tubing, and enables the resultant tubing to be foamed with ease to the extent desired. Thus for melt extrusion in general, the process of the present invention enables the best extrusion resin to be used for the particular application, to be followed by the foaming process.

EXAMPLES

General procedure—The following general procedure was used unless otherwise indicated. The articles tested were formed by compression molding of pellets of the fluoropolymer (cold compacting in the case of PTFE), into film which was about 0.4 mm thick and about 12.5 mm square. The pressure vessel used was made of Monel corrosion resistant metal and had an volume of one liter. It was equipped with an inlet for pressurized $CO_2$, a pressure gauge, and a valve for venting. The vessel had heater bands around its circumference for heating the article placed in the interior of the pressure vessel. A small pedestal was present within the vessel, and the articles to be treated were placed on this pedestal. The vessel was pressurized with the $CO_2$ cold, i.e., the article was inside the vessel, but it had not yet been heated. The vessel was heated to the temperature desired and held at that temperature (soak temperature) for one hour, observing the pressure increase with increasing temperature, during which time the supercritical $CO_2$ uniformly permeates the film and the film becomes uniformly heated. Because of this long heating time, the temperature of the film was believed to be the temperature of the vessel; it is also believed that shorter heating time can be used and still have permeation and temperature uniformity. The pressures stated in the Examples are gauge pressures. The vessel was depressurized by venting of the $CO_2$, which took about one minute, and then the vessel was allowed to cool for removal of the foamed article. Void content of the foamed article was determined by measuring the bulk density of the foamed article by the procedure of ASTM D 792, and dividing this by 2.15 as the true density for all fluoropolymers, except as otherwise indicated, in accordance with the following equation:

void content (fraction)=1−bulk density/2.15 Cell size was estimated by inspection of magnified cross-sections of the foamed structure.

EXAMPLE 1

ECTFE resin available as Halar® 500 resin available from Ausimont and a melting point 260° C., was formed into a film and placed in the pressure vessel. The vessel was pressurized with $CO_2$ to 1000 psi (6.9 MPa) and was then heated to 220° C. and soaked at that temperature for 1 hour. The $CO_2$ pressure increased to 2600 psi (18 MPa). The $CO_2$ pressure was then released by venting and the vessel was allowed to cool to room temperature before removal of the film. The film, which was transparent before this processing, was opaque and had a void content of 56% (true density was 1.674 and bulk density was 0.7308).

EXAMPLE 2

Example 1 was repeated except that the ECTFE was compounded with foam cell nucleating agent: 0.25 wt %
KS-8 and 0.01 wt % calcium tetraborate (CTB). The void content after foaming was 60%.

Visual inspection of SEM at 150× magnification of cross-sections of the foamed film of Examples 1 and 2 indicated that accompanying the increase in void content for the film of Example 2, the cell size decreased for the foam structure of this film as compared to the foamed film of Example 1.

EXAMPLE 3

Example 1 was repeated except that the polymer was TFE/HFP copolymer available from DuPont as Teflon® FEP fluoropolymer resin grade 4100N, having a melting point of 260° C. The soaking temperature was 240° C., and the resultant foamed film had a void content of 77% (bulk density 0.4879).

EXAMPLE 4

Example 3 was repeated except that the polymer was compounded with foam cell nucleating agent: 0.25 wt % BN, 0.011 wt % CTB, and 0.007 wt % BaS-10. The foamed film had a void content of 47% (true density 2.18 and bulk density 1.1619). The average cell sizes were about 50 micrometers for the film of Example 3 and 5 to 10 micrometers in diameter for the film of Example 3.

EXAMPLE 5

Example 1 was repeated except that the polymer was ETFE and the article was an extruded sheet 0.4 mm thick. The foamed sheet had a void content of 47% (true density 1.678 and bulk density of 0.8755).

EXAMPLE 6

(a) Example 1 was repeated except that the polymer was TFE/PPVE copolymer available as Teflon® PFA fluoropolymer resin grade 340, having a melting point of 305° C., the pressurization with $CO_2$ was to 1200 psi (8.3 MPa), the soak temperature was 300° C., at which temperature, the $CO_2$ pressure in the vessel was 4200 psi (30 MPa). The fluoropolymer contained foam cell nucleating agent: 0.25 wt % BN, 0.011 wt % CTB, and 0.018 wt % BaS-10). The foamed film had a void content of 72% (bulk density 0.613) and an average cell size of 10 micrometers.

(b) When nitrogen was substituted for the $CO_2$, no foaming occurred, even when the vessel was initially pressurized to 2000 psi (13.8 MPa) before heatup.

(c) The procedure of Example 6(a) was repeated except that the soak temperature was 325° C. (pressure 4000 psi, 27 MPa). The resultant foamed article had the foam cell structure of FIG. 3, wherein the foam cell walls have apertures giving the appearance of Swiss cheese. The average cell size was about 100 micrometers.

Figure 4:
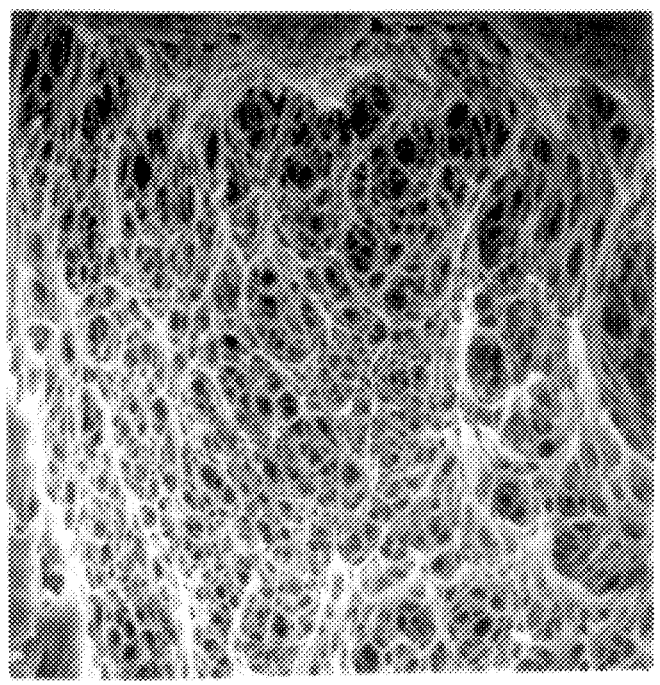
FIG. 4 is a SEM at 10,000× magnification of a cross-section of an article of melt-fabricable fluoropolymer made using the process of the present invention as practiced in Example 6(d).

(d) The procedure of Example 6(a) was repeated except that the soak temperature was 280° C. (pressure 3500 psi, 24 MPa). The resultant foamed article had the fibrillar foamed structure shown in FIG. 4.

Comparison of the results of Examples 6(c) and (d) shows that completely different morphology of the foamed structure can be obtained by varying the soak temperature at which foaming is carried out and that a much more porous structure is obtained at temperature below the melting temperature of the resin.

EXAMPLE 7

Example 1 was repeated except that the film was made of PTFE granular resin and was then sintered, the PTFE contained PPVE comonomer modifier, the PTFE had a melting point of 327° C., the soak temperature was 310° C. The $CO_2$ pressure within the vessel increased to 3500 psi (24.2 MPa) at the soak temperature, and the foamed film had a void content well in excess of 40%.

EXAMPLE 8

Example 7 was repeated except that the article was tubing which was paste extruded from PTFE fine powder available as Teflon® fluoropolymer resin grade 62 and having a melting point of 327° C., and the soak temperature was 330° C. The void content of the tubing was 15.7. The foamed structure of the tubing was visible at 10,000× magnification (FIG. 1) as a three-dimensional network of fibrils which included ladderlike formation and wherein the fibrils exhibited an L/D of greater than 10.

EXAMPLE 9

Example 7 was repeated except that the article was tubing which was paste extruded from Teflon® 62 fine powder. The tubing dimensions were 19 mm O.D. and wall thickness was 0.4 mm, and the tubing was cut into 12.5 mm lengths for foaming. In one set experiments, the tubing samples were not sintered, and in another set, the tubing samples were sintered at 375° C. for one-half hour, followed by 400° C. for one minute, after having first dried the samples at about 95° C. to remove the lubricant present from the paste extrusion. Each set of samples were subjected to different soak temperatures, with the results indicated in the following table:

|  | Soak Temperature (°C.) | Void Content |
| --- | --- | --- |
| unsintered | 310 | 23.0% |
| sintered | 310 | 12.9 |
| unsintered | 330 | 19.4 |
| sintered | 330 | 15.7 |
| unsintered | 350 | 9.7 |
| sintered | 350 | 14.7 | note:
The sample sintered and soaked at 330° C. is the same as the tubing of Example 8.

EXAMPLE 10

The article in this experiment was a billet molded from modified PTFE granular resin wherein the modifier was perfluoro(propyl vinyl ether) (PPVE). The billet was unsintered, whereby the melting point (first) of the resin was 340° C. Sintering of the resin requires heating of the billet to a higher temperature than 340° C., and usually this heating will be carried out at 400° C. After sintering, the melting point (second) of the resin will be slightly less than 327° C. The second melting point of PTFE resin is 327° C., but the presence of the small amount of PPVE comonomer modifier slightly reduces this melting point.

In this experiment, the billet was heated (soaked) at 325° C. for 4 hours. During this heating, the $CO_2$ pressurization carried out as in Example 1 rose to 4200 psi (29 MPa) from an initial pressure of 1000 psi (6.9 MPa). The billet was then cooled slowly to 250° C. over 25 minutes before venting the $CO_2$ from the pressure vessel. Tape skived from the billet had a void content of 33%.

DSC scan performed on the skived tape showed only a single melting peak of about 326° C. indicating that the billet (resin) was sintered even though the 340° C. first melting point was not reached.

What is claimed is:

1. Process for foaming an article comprising fluoropolymer containing at least 35 wt. % fluorine which has already been fabricated, comprising (a) heating the article to a temperature above 200° C. to a foamable state, (b) pressurizing the heated article with supercritical $CO_2$, (c) depressurizing the pressurized heated article while still in the foamable state, whereby said $CO_2$ foams said article, and (d) cooling said foamed article.

2. Process of claim 1 wherein said fluoropolymer is polytetrafluoroethylene.

3. Process of claim 2 wherein said polytetrafluoroethylene is unsintered.

4. Process of claim 1 wherein said fluoropolymer is melt-fabricable.

5. Process of claim 4 wherein said fluoropolymer is a copolymer of tetrafluoroethylene with at least one monomer selected from the group consisting of ethylene, perfluoroolefin having from 3 to 8 carbon atoms, perfluoro(alkyl vinyl ether) having from 3 to 12 carbon atoms, and perfluoroalkyl ethylene having from 3 to 8 carbon atoms.

6. Process of claim 4 wherein said fluoropolymer is chlorotrifluoroethylene/ethylene copolymer.

7. Process of claim 1 wherein said article is in the form of wire insulation, tubing, rod, or film.

8. Process of claim 1 wherein said heating is within 50° C. of the melting point of said fluoropolymer.

9. Process of claim 4 wherein said fluoropolymer contains foam cell nucleating agent.

10. Process of claim 2 wherein said foamed article has a cell size of less than 2 micrometers.

11. Process of claim 2 wherein said heating sinters said article during the foaming thereof.

12. Process of claim 5 wherein said monomer is said perfluoroolefin or said perfluoro(alkyl vinyl ether).

13. Process of claim 1 wherein said heating is to a temperature above the melting temperature of said fluoropolymer.

14. The process of claim 1 wherein said article is in the form of insulation or jacketting on wire or cable.

15. The process of claim 1 wherein said article is in the form of tubing.

* * * * *